(12) United States Patent
Takada et al.

(10) Patent No.: US 11,358,095 B2
(45) Date of Patent: *Jun. 14, 2022

(54) ELECTROCHEMICAL REACTOR

(71) Applicant: TOYOTA JIDOSHA KABUSHIKI KAISHA, Toyota (JP)

(72) Inventors: Keishi Takada, Ashigarakami-gun (JP); Tetsuya Sakuma, Gotemba (JP); Yasumasa Notake, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 61 days.

This patent is subject to a terminal disclaimer.

(21) Appl. No.: 16/731,147

(22) Filed: Dec. 31, 2019

(65) Prior Publication Data

US 2020/0215481 A1 Jul. 9, 2020

(30) Foreign Application Priority Data

Jan. 8, 2019 (JP) .............................. JP2019-001197

(51) Int. Cl.
*B01D 53/32* (2006.01)
*B01D 53/92* (2006.01)
(Continued)

(52) U.S. Cl.
CPC ......... *B01D 53/326* (2013.01); *B01D 53/925* (2013.01); *F01N 3/01* (2013.01);
(Continued)

(58) Field of Classification Search
CPC ................ B01D 53/326; B01D 53/925; B01D 2258/012; B01D 53/9422; B01D 53/945;
(Continued)

(56) References Cited

U.S. PATENT DOCUMENTS 6,245,214 B1    6/2001   Rehg et al.
6,331,232 B1   12/2001   Lundgren et al.
(Continued)

FOREIGN PATENT DOCUMENTS

JP       S61-078421 A    4/1986
JP    2003-047827 A    2/2003
(Continued)

OTHER PUBLICATIONS

U.S. Office Action issued in U.S. Appl. No. 16/736,064 dated Jun. 29, 2021.
(Continued)

*Primary Examiner* — Brandon D Lee
(74) *Attorney, Agent, or Firm* — Oblon, McClelland, Maier & Neustadt, L.L.P.

(57) ABSTRACT

An electrochemical reactor is arranged inside an exhaust passage of an internal combustion engine and is provided with a plurality of groups of cells. Each group of cell has a plurality of cells, each cell has an ion conducting solid electrolyte layer, and an anode layer and cathode layer arranged on a surface of the solid electrolyte layer. Each group of cells is configured so that all of the exhaust gas flows into passages defined by cells configuring the group of cells and so that both of the anode layers and the cathode layers are exposed to each passage. The plurality of groups of cells are arranged aligned in a direction of flow of exhaust gas and different groups of cells are connected to a power source in parallel with each other.

3 Claims, 7 Drawing Sheets

(51) Int. Cl.
  *F01N 3/01* (2006.01)
  *F01N 3/08* (2006.01)
  *F01N 13/00* (2010.01)

(52) U.S. Cl.
  CPC ......... *F01N 3/0892* (2013.01); *F01N 13/009* (2014.06); *B01D 2258/012* (2013.01)

(58) Field of Classification Search
  CPC ........ B01D 2257/404; B01D 2257/502; B01D 2257/702; F01N 3/01; F01N 3/0892; F01N 13/009; F01N 3/08; F01N 2570/14; F01N 2570/12; F01N 2570/10; Y02T 10/12
  See application file for complete search history.

(56) References Cited

U.S. PATENT DOCUMENTS

| | | | |
|---|---|---|---|
| 10,502,106 B1 | 12/2019 | Sakuma et al. | |
| 10,794,250 B2 | 10/2020 | Sakuma et al. | |
| 2007/0186544 A1* | 8/2007 | Elwart | B01D 53/9454 60/299 |
| 2009/0145108 A1* | 6/2009 | Koide | F01N 3/0892 60/275 |
| 2009/0162257 A1 | 6/2009 | Koide et al. | |
| 2009/0173623 A1 | 7/2009 | Kato | |
| 2020/0215482 A1 | 7/2020 | Sakuma et al. | |

FOREIGN PATENT DOCUMENTS

| | | | | |
|---|---|---|---|---|
| JP | 2006-189023 A | 7/2006 | | |
| JP | 2006-289214 A | 10/2006 | | |
| JP | 2006-346624 A | 12/2006 | | |
| JP | 2009-125622 A | 6/2009 | | |
| JP | 2009-138522 A | 6/2009 | | |
| JP | 2012-61449 A | 3/2012 | | |
| JP | 2012-193698 A | 10/2012 | | |
| WO | WO-2014174609 A1 * | 10/2014 | ............... | B03C 3/47 |

OTHER PUBLICATIONS

U.S. Notice of Allowance issued in U.S. Appl. No. 16/412,731 dated Jul. 25, 2019.
Notice of Allowance dated Oct. 6, 2021 in co-pending U.S. Appl. No. 16/736,064, 9 pages.
U.S. Notice of Allowance issued in U.S. Appl. No. 16/736,064 dated Jan. 25, 2022.
Corrected Notice of Allowability issued in U.S. Appl. No. 16/736,064 dated Apr. 8, 2022.

* cited by examiner

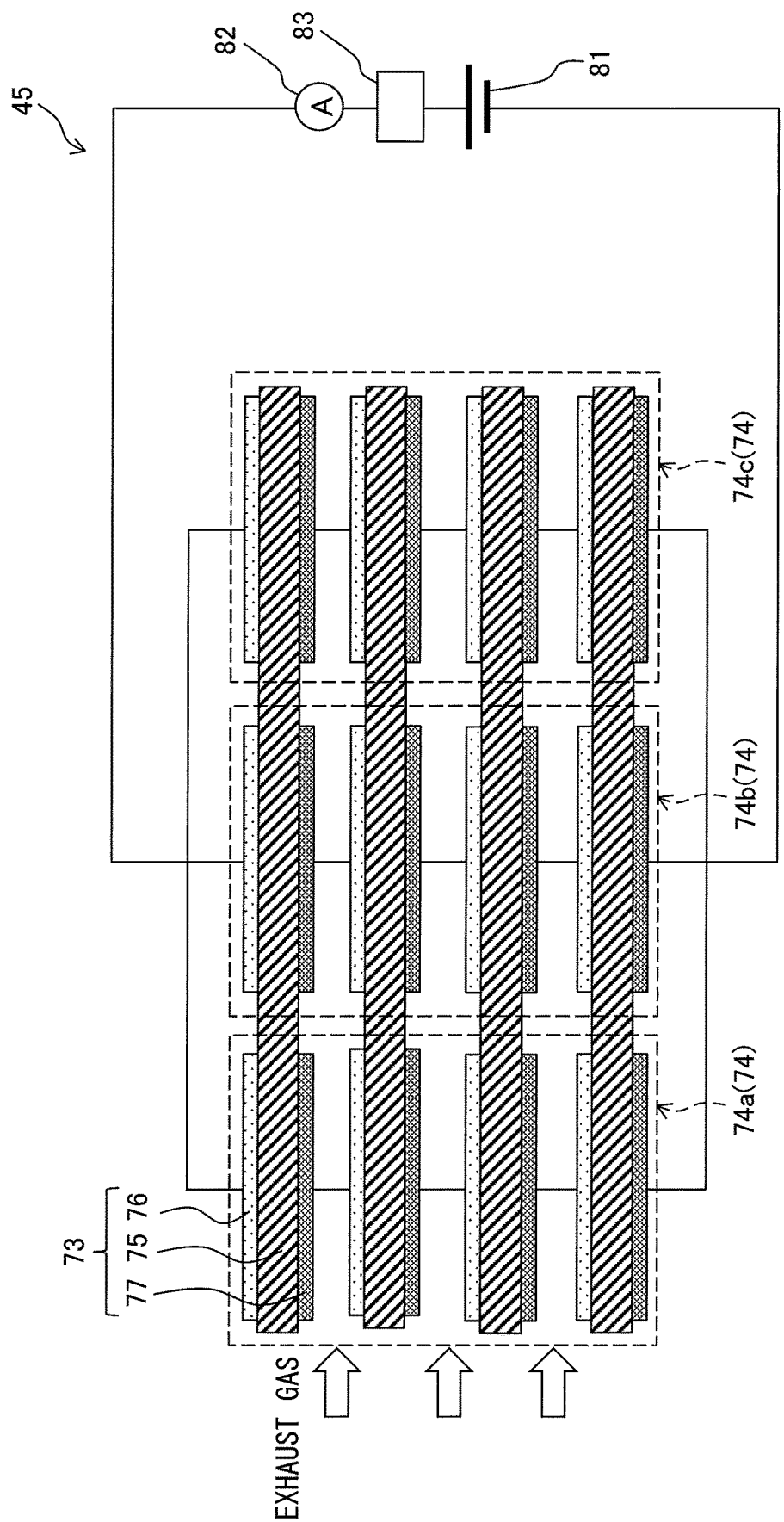

ELECTROCHEMICAL REACTOR

FIELD

The present disclosure relates to an electrochemical reactor.

BACKGROUND

Known in the past has been an internal combustion engine provided inside an exhaust passage with an electrochemical reactor including a plurality of cells respectively provided with ion conducting solid electrolyte layers and with anode layers and cathode layers arranged on the surfaces of the solid electrolyte layers (for example, PTL 1). In such an electrochemical reactor, if the electrochemical reactor is supplied with current so as to flow from the anode layers through the solid electrolyte layers to the cathode layers, $NO_X$ is reduced to $N_2$ on the cathode layers and purified.

In particular, in the electrochemical reactor described in PTL 1, a plurality of cells are arranged aligned with each other in a direction perpendicular to the direction of flow of exhaust and parallel with each other. The exhaust gas flows through passages defined by two cells. The $NO_X$ in the exhaust gas is purified while the exhaust gas flows through the passages.

CITATIONS LIST

Patent Literature

[PTL 1] Japanese Unexamined Patent Publication No. 2009-138522

SUMMARY

Technical Problem

In this regard, in an electrochemical reactor, sometimes wire disconnection or another malfunction cause cells to no longer normally operate. In this case, depending on the cells, it becomes no longer possible to purify the $NO_X$ in the exhaust gas. In the electrochemical reactor described in PTL 1, if such a malfunction occurs in some of the cells, it becomes no longer possible to purify the $NO_X$ in the exhaust gas flowing through the passages defined by those cells. As a result, the purification rate of the exhaust gas by the electrochemical reactor decreases.

In consideration of the above problem, an object of the present disclosure is to provide an electrochemical reactor in which the purification rate of the exhaust gas by the electrochemical reactor is kept from decreasing even if some of the cells of the plurality of cells malfunction.

Solution to Problem

The present invention was made so as to solve the above problem and has as its gist the following.

(1) An electrochemical reactor arranged inside an exhaust passage of an internal combustion engine and comprising a plurality of groups of cells, wherein each group of cell has a plurality of cells, each cell having an ion conducting solid electrolyte layer, and an anode layer and cathode layer arranged on a surface of the solid electrolyte layer, each group of cells is configured so that all of the exhaust gas flows into passages defined by cells configuring the group of cells and so that both of the anode layers and the cathode layers are exposed to each passage, and the plurality of groups of cells are arranged aligned in a direction of flow of exhaust gas and different groups of cells are connected to a power source in parallel with each other.

(2) The electrochemical reactor according to above (1), wherein the cells configuring each of the group of cells are at least partially connected in series.

(3) The electrochemical reactor according to above (1) or (2), wherein corresponding cells of adjoining groups of cells are configured so that solid electrolyte layers of these cells are joined with each other through spacers.

(4) The electrochemical reactor according to above (3), wherein corresponding cells of adjoining groups of cells are configured so as to share an integral single solid electrolyte layer.

Advantageous Effects of Invention

According to the present invention, it is possible to provide an electrochemical reactor in which the purification rate of the exhaust gas by the electrochemical reactor is kept from decreasing even if some of the cells of the plurality of cells malfunction.

BRIEF DESCRIPTION OF DRAWINGS

FIG. 7 is an enlarged cross-sectional view, similar to FIG. 3, showing the configuration of an electrochemical reactor according to another modification.

DESCRIPTION OF EMBODIMENT

Figure 1:
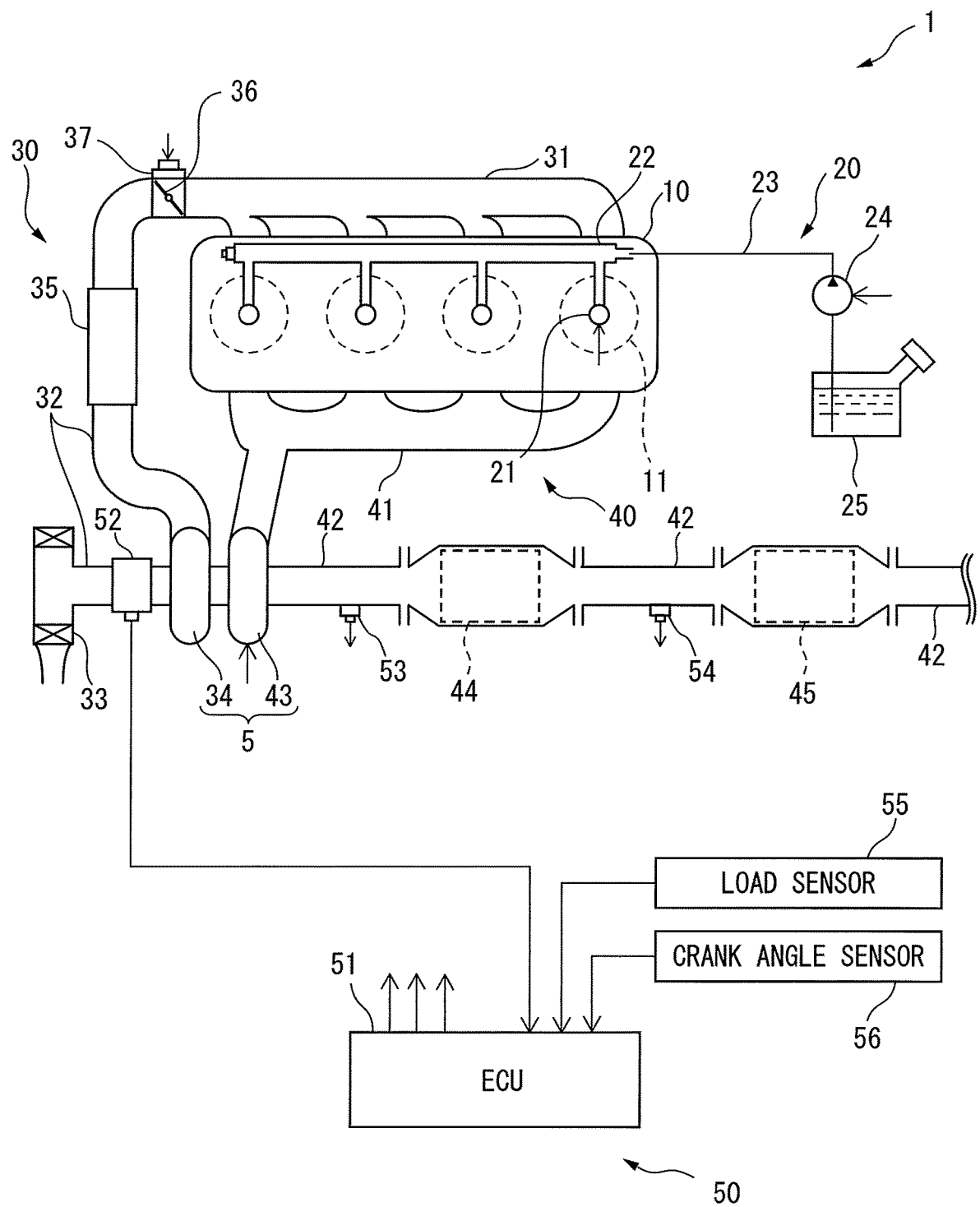
FIG. 1 is a schematic view of the configuration of an internal combustion engine.

Below, referring to the drawings, embodiments will be explained in detail. Note that, in the following explanation, similar component elements are assigned the same reference numerals.

Explanation of Internal Combustion Engine as a Whole

Referring to FIG. 1, the configuration of an internal combustion engine 1 mounting an electrochemical reactor according to one embodiment will be explained. FIG. 1 is a schematic view of the configuration of the internal combustion engine 1. As shown in FIG. 1, the internal combustion engine 1 is provided with an engine body 10, fuel feed system 20, intake system 30, exhaust system 40 and control device 50.

The engine body 10 is provided with a cylinder block in which a plurality of cylinders 11 are formed, a cylinder head and a crank case. A piston 14 is arranged in each cylinder 11, and each cylinder 11 is connected to intake ports and exhaust port.

The fuel feed system 20 is provided with fuel injectors 21, a delivery pipe 22, fuel feed pipe 23, fuel pump 24, and fuel tank 25. Each fuel injector 31 is arranged in the cylinder head so as to directly inject fuel into each cylinder 11. The fuel pumped out by the fuel pump 24 is supplied through the fuel feed pipe 23 to the delivery pipe 22, and then is injected from the fuel injector 21 into the cylinder 11.

The intake system 30 is provided with an intake manifold 31, intake pipe 32, air cleaner 33, compressor 34 of a turbocharger 5, intercooler 35, and throttle valve 36. The intake port of each cylinder 11 is communicated through the intake manifold 31 and the intake pipe 32 with the air cleaner 33. The intake pipe 32 is provided with the compressor 34 of the exhaust turbocharger 5 for compressing and discharging intake air, and the intercooler 35 for cooling the air compressed by the compressor 34. The throttle valve 36 is driven so as to be opened and closed, by a throttle valve drive actuator 37.

The exhaust system 40 is provided with an exhaust manifold 41, exhaust pipe 42, turbine 43 of the exhaust turbocharger 5, exhaust purification catalyst 44, and electrochemical reactor (hereinafter, simply referred to as "reactor") 45. The exhaust port of each cylinder 11 is communicated through the exhaust manifold 51 and the exhaust pipe 52 with the exhaust purification catalyst 44, and the exhaust purification catalyst is communicated through the exhaust pipe 42 with the electrochemical reactor 45. The exhaust purification catalyst 44 is, for example, a three-way catalyst or NOx storage reduction catalyst, and purify composition in the exhaust gas, such as NOx or unburned HC when the temperature thereof is equal to or greater than a constant activation temperature. In the exhaust pipe 42, the turbine 43 of the exhaust turbocharger 5, which is driven to rotate by the energy of the exhaust gas, is provided. The exhaust port, exhaust manifold 41, exhaust pipe 42, exhaust purification catalyst 44 and reactor 45 form an exhaust passage. Therefore, the reactor 45 is disposed in the exhaust passage. Note that the exhaust purification catalyst 44 may be provided downstream side of the reactor 45 in the flow direction of the exhaust gas.

The control device 50 is provided with an electronic control unit (ECU) 51 and various types of sensors. The sensors includes, for example, a flow rate sensor 52 for detecting the flow rate of air flowing through the intake pipe 32, an air-fuel ratio sensor 53 for detecting the air-fuel ratio of the exhaust gas, a NOx sensor 54 for detecting the NOx concentration of the exhaust gas flowing into the reactor 45. These sensors are connected to ECU. Further, the ECU 51 is connected to the actuators controlling the operation of the internal combustion engine 1. In the example shown in FIG. 1, the ECU51 is connected to the fuel injectors 21, fuel pump 24 and throttle valve drive actuator 37 and controls these actuators.

Configuration of Electrochemical Reactor

Figure 2:
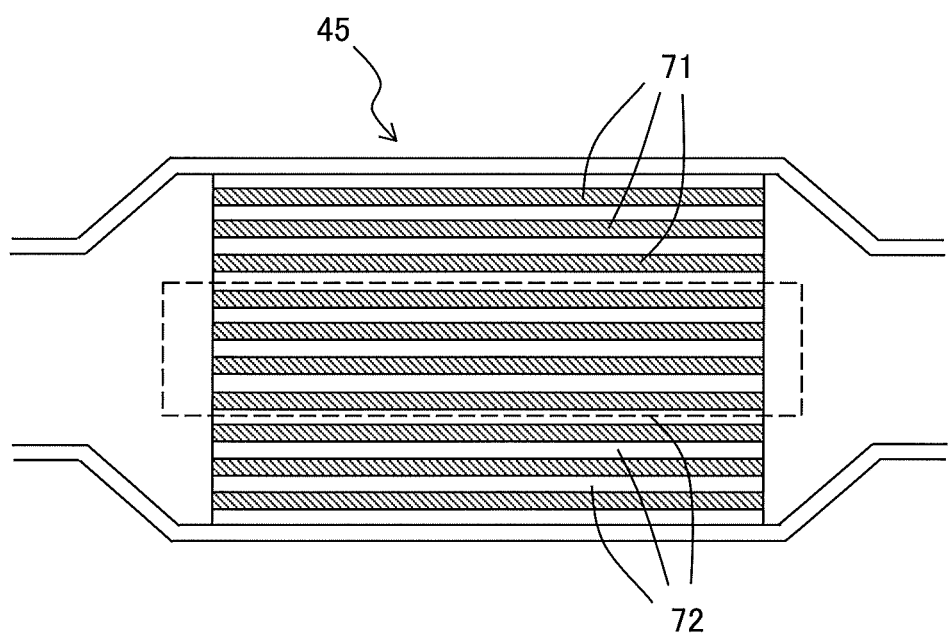
FIG. 2 is a cross-sectional side view of an electrochemical reactor.

Next, referring to FIGS. 2 to 4, the configuration of the reactor 45 according to the present embodiment will be explained. FIG. 2 is a cross-sectional side view of the reactor 45. As shown in FIG. 2, the reactor 45 is provided with partition walls 71 and passages 72 defined by the partition walls. The partition walls 71 are provided with a plurality of first partition walls extending in the direction of flow of exhaust (that is, the axial direction of the reactor 45) and parallel to each other and a plurality of second partition walls extending in the direction of flow of exhaust and perpendicular to the first partition walls and parallel to each other. The passages 72 are defined by these first partition walls and second partition walls and extend in the direction of flow of exhaust parallel to each other. Therefore, the reactor 45 according to the present embodiment has a honeycomb structure. The exhaust gas flowing into the reactor 45 flows passing through the plurality of passages 72. Note that, the partition walls 71 may also be formed from only the plurality of partition walls extending parallel to each other and formed without being provided with partition walls perpendicular to these plurality of partition walls.

Figure 3:
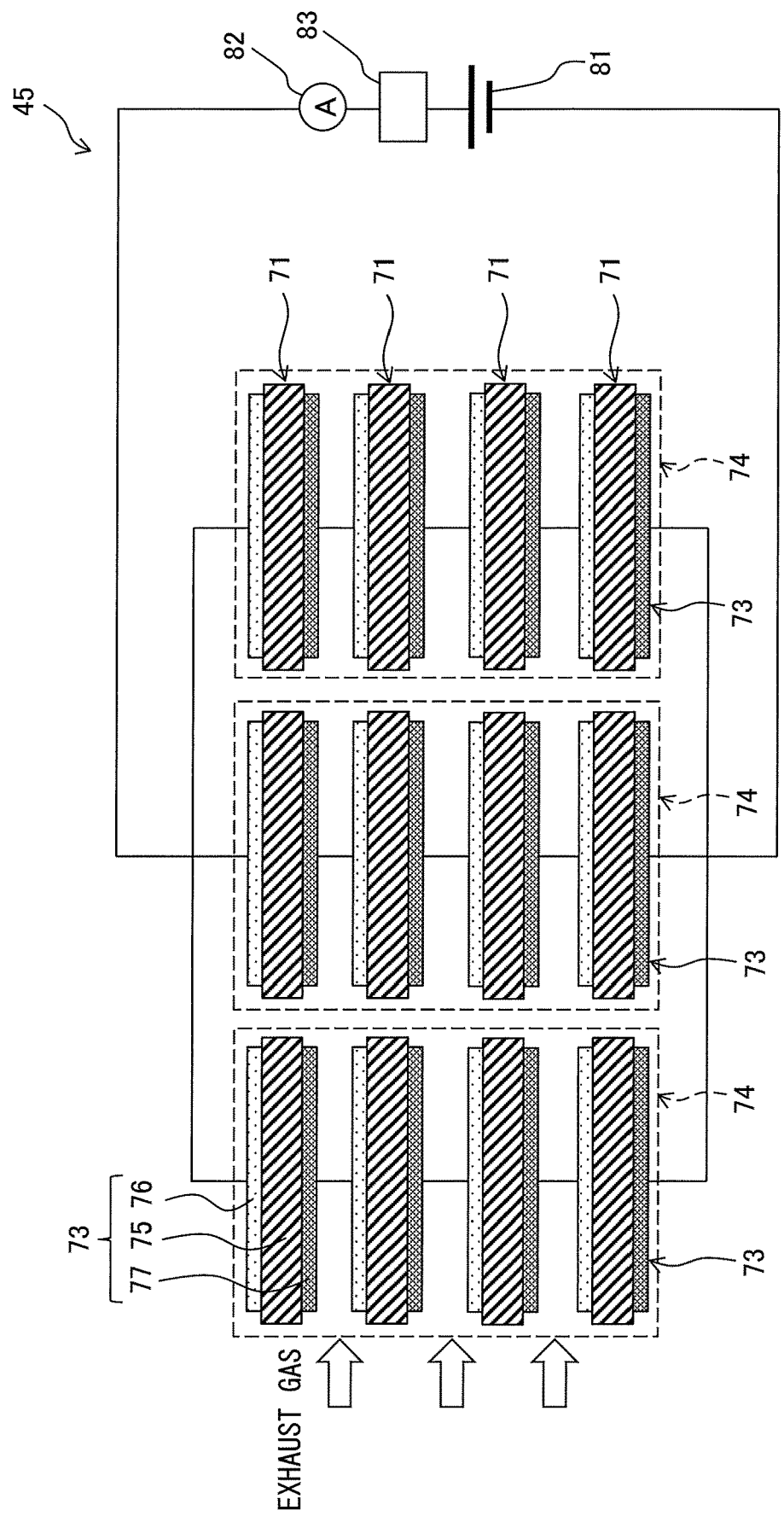
FIG. 3 is an enlarged cross-sectional view schematically showing a region shown by broken lines in FIG. 2.

FIG. 3 is an enlarged cross-sectional view schematically showing a region shown by broken lines in FIG. 2. The arrows in the figure show the direction of flow of exhaust gas passing through the reactor 45. As shown in FIG. 3, the partition walls 71 are configured by a plurality of cells 73 arranged aligned in the direction of flow of exhaust.

As shown in FIG. 3, the cells 73 are arranged to extend in the direction of flow of exhaust (direction shown by arrows in FIG. 3). Further, a plurality of cells 73 are arranged aligned in the direction of flow of exhaust. In the present embodiment, three cells are arranged aligned in the direction of flow of exhaust from an upstream end to a downstream end of the reactor 45. The plurality of cells 73 arranged aligned in the direction of flow of exhaust are arranged together on the same plane. Note that, the number of cells arranged aligned in the direction of flow of exhaust from the upstream end to the downstream end of the reactor 45 may also be two, or four or more.

Further, as shown in FIG. 3, a plurality of cells 73 are arranged aligned in a direction perpendicular to the direction of flow of exhaust (below, also referred to as "direction perpendicular to the exhaust"). Among the plurality of cells 73 arranged aligned in the direction perpendicular to the exhaust, the cells 73 forming the first partition walls are arranged parallel to each other at equal intervals. Similarly, among the plurality of cells 73 arranged aligned in the direction perpendicular to the exhaust, the cells 73 forming the second partition walls are arranged parallel to each other at equal intervals. Further, the cells 73 forming the first partition walls and the cells 73 forming the second partition walls are arranged perpendicular to each other.

Below, a plurality of cells 73 arranged aligned in a direction perpendicular to the exhaust will be referred to together as a "group of cells 74". The upstream ends of the plurality of cells 73 included in each group of cells 74 are positioned on substantially the same plane (plane extending in direction perpendicular to exhaust). The downstream ends of the plurality of cells 73 included in each group of cells 74 are positioned on substantially the same plane (plane extending in direction perpendicular to exhaust). The plurality of cells 73 forming each group of cells 74 define a plurality of passages 72 through which the exhaust gas flows. In particular, each group of cells 74 is configured so that all of the exhaust gas flows into the passages defined by all of the cells 73 forming the group of cells 74.

As explained above, in the present embodiment, a plurality of cells 73 are arranged aligned in the direction of flow of exhaust. Therefore, a plurality of groups of cells 74 are also arranged aligned in the direction of flow of exhaust. In the present embodiment, three groups of cells are arranged aligned in the direction of flow of exhaust. Note that, the number of groups of cells 74 arranged aligned in the direction of flow of exhaust may also be two, or four or more.

Note that, in the present embodiment, the cells 73 forming each group of cells 74 are arranged aligned in a direction perpendicular to the exhaust in parallel with each other. However, the cells 73 forming a group of cells 74 do not necessarily have to be arranged aligned in the direction perpendicular to the exhaust if arranged at an angle with respect to the direction of flow of exhaust.

Figure 4:
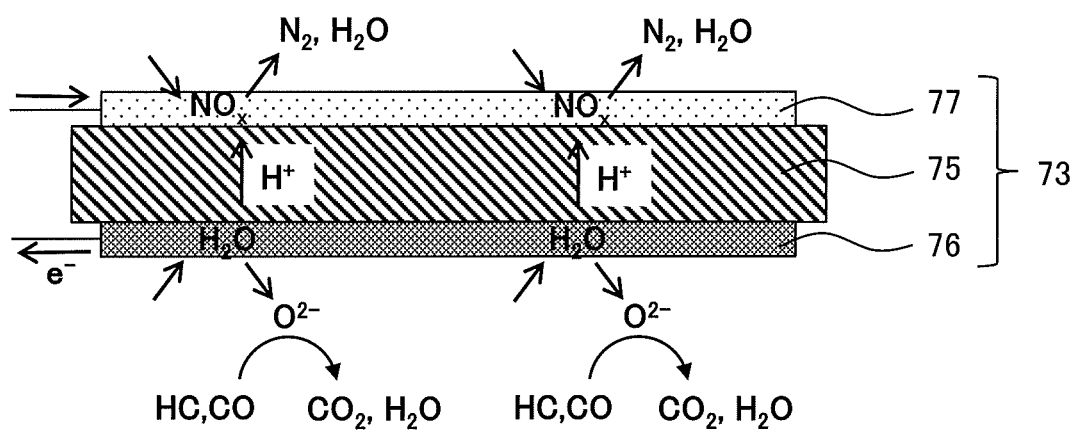
FIG. 4 is an enlarged cross-sectional view of a cell.

FIG. 4 is an enlarged cross-sectional view of a cell 73. Each cell 73 is provided with a solid electrolyte layer 75, an anode layer 76 arranged on one surface of the solid electrolyte layer 75, and a cathode layer 77 arranged on the surface of the solid electrolyte layer 75 at the opposite side to the surface at which the anode layer 76 is arranged.

The solid electrolyte layer 75 includes a porous solid electrolyte having proton conductivity. As the solid electrolyte, for example, a perovskite type metal oxide $MM'_{1-x}R_xO_{3-\alpha}$ (M=Ba, Sr, Ca, M'=Ce, Zr, R=Y, Yb, for example, $SrZr_xYb_{1-x}O_{3-\alpha}$, $SrCeO_3$, $BaCeO_3$, $CaZrO_3$, $SrZrO_3$, etc.), a phosphate (for example, $SiO_2$—$P_2O_5$-based glass, etc.), metal doped $Sn_xIn_{1-x}P_2O_7$ (for example, $SnP_2O_7$, etc.) or zeolite (for example, ZSM-5) are used.

The anode layer 76 and the cathode layer 77 both include Pt, Pd, Rh, or other noble metals. Further, the anode layer 76 includes a substance able to hold (that is, able to adsorb and/or absorb) water molecules. Specifically, the substance able to hold water molecules includes zeolite, silica gel, activated alumina, etc. On the other hand, the cathode layer 77 includes a substance able to hold (that is, able to adsorb and/or absorb) $NO_X$. Specifically, the substance able to hold $NO_X$ includes K, Na, or another alkali metal, Ba or another alkali earth metal, La or another rare earth, etc.

As will be understood from FIG. 3, in the present embodiment, in each group of cells 74, among a plurality of cells 73 defining one passage 72, part of the cells 73 are configured so that the anode layers 76 are exposed to the passage 72, while the other cells 73 are configured so that the cathode layers 77 are exposed to the passage 72. Therefore, the groups of cells 74 are configured so that both anode layers 76 and cathode layers 77 are exposed to each passage 72.

Note that, in the above embodiment, the anode layers 76 and cathode layers 77 are arranged on the two surfaces of the solid electrolyte layers 75 at opposite sides. However, the anode layers 76 and cathode layers 77 may also be arranged on the same surfaces of the solid electrolyte layers 75. In this case, protons move through the vicinities of the surfaces of the solid electrolyte layers 75 where the anode layers 76 and cathode layers 77 are arranged.

Further, each of the anode layers 76 may contain two layers of a conductive layer including a noble metal having electroconductivity and a water molecule holding layer including a substance able to hold water molecules. In this case, a conductive layer is arranged on the surface of the solid electrolyte layer 75, while a water molecule holding layer is arranged on the surface of the conductive layer at the opposite side to the solid electrolyte layer 75 side.

Similarly, each of the cathode layers 77 may also contain two layers of a conductive layer including a noble metal having electroconductivity and an $NO_X$ holding layer including a substance able to hold $NO_X$. In this case, a conductive layer is arranged on the surface of the solid electrolyte layer 75, while an $NO_X$ holding layer is arranged on the surface of the conductive layer at the opposite side to the solid electrolyte layer 75 side.

Circuit Configuration of Electrochemical Reactor

Further, the reactor 45 is provided with the power device 81, ammeter 82, and voltage regulator 83.

The power device 81 is connected to the cells 73 of the reactor 45 and supplies power to the cells 73. The positive electrode of the power device 81 is connected to the anode layers 76, while the negative electrode of the power device 81 is connected to the cathode layers 77. More specifically, in the present embodiment, the plurality of cells 73 of each group of cells 74 are connected in series. Therefore, the anode layer 76 of one cell 74 of the group of cells 74 is connected with the cathode layer 77 of another cell 73 of the group of cells 74. In particular, in the present embodiment, all of the cells 73 forming one group of cells 74 are connected in series (in FIG. 3, only part of the cells 73 of the group of cells 74 are connected in series, but other cells 73 forming the group of cells 74 not shown in FIG. 3 are also connected in series). In such a series connected plurality of cells 73, the anode layer 76 of the cell 73 at one end and the cathode layer 77 of the cell 73 at the other end are connected to the power device 81.

However, it is not necessary for all of the cells 73 forming one group of cells 74 to be connected in series. Therefore, set numbers of cells 73 forming one group of cells 74 may be connected in series with each other, and a plurality of the set numbers of cells 73 connected in series may be connected in parallel with each other. Therefore, the cells 74 forming one group of cells 74 are at least partially connected in series. Note that, all of the cells 73 forming one group of cells 74 may be connected in parallel to the power device 81.

On the other hand, in the present embodiment, the different groups of cells 74 arranged aligned in the direction of flow of exhaust gas are connected in parallel to the power device 81. Therefore, the cells 73 arranged aligned in the direction of flow of exhaust are connected in parallel with each other to the power device 81.

The ammeter 82 detects the current supplied from the power device 81 to the cells 73 of the reactor 45.

The voltage regulator 83 is configured to be able to change the voltage applied between the anode layers 76 and the cathode layers 77. Further, the voltage regulator 83 is configured to change the magnitude of the current supplied to the reactor 45 so that it flows from the anode layers 76 through the solid electrolyte layers 75 to the cathode layers 77.

The power device 81 is connected in series with the ammeter 82. Further, the ammeter 82 is connected to the ECU 51 and sends the detected current value to the ECU 51. Furthermore, the voltage regulator 83 is connected to the ECU 51 and is controlled by the ECU 51. In the present embodiment, the voltage regulator 83, for example, controls the voltage so that the current value detected by the ammeter 82 becomes the target value.

Purification by Reactor

Referring to FIG. 4, the reactions occurring at the reactor 45 configured as explained above will be explained. At the reactor 45, if current flows from the power device 81 to the anode layers 76 and cathode layers 77, reactions such as shown in the following formulas occur at the anode layers 76 and cathode layers 77:

Anode side: 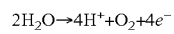
$$2H_2O \rightarrow 4H^+ + O_2 + 4e^-$$

Cathode side: 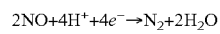
$$2NO + 4H^+ + 4e^- \rightarrow N_2 + 2H_2O$$

That is, at the anode layers 76, the water molecules held at the anode layers 76 are electrolyzed whereby oxygen and protons are generated. The generated oxygen is discharged into the exhaust gas while the generated protons move through the solid electrolyte layers 75 from the anode layers 76 to the cathode layers 77. At the cathode layers 77, the NO held at the cathode layers 77 reacts with the protons and electrons whereby nitrogen and water molecules are generated.

Therefore, according to the present embodiment, by applying current from the power device 81 of the reactor 45 to the anode layers 76 and cathode layers 77, the NO in the exhaust gas can be reduced to $N_2$ and purified.

Further, at the anode layers 76, when the exhaust gas contains unburned HC or CO, etc., due to the reactions shown in the following formulas, the oxygen ions react with the HC and CO whereby carbon dioxide and water are generated. Note that, unburned HC contains various constituents, therefore in the following reaction formulas, unburned HC is represented as $C_mH_n$. Therefore, according to the present embodiment, by applying current from the power device 81 of the reactor 45 to the anode layer 76 and cathode layer 77, the HC and CO in the exhaust gas can be oxidized and purified:

$$C_mH_n+(2m+0.5n)O^{2-} \rightarrow mCO_2+0.5nH_2O+(4m+n)e^-$$

$$CO+O^{2-} \rightarrow CO_2+2e^-$$

As explained above, in the present embodiment, the cells 73 of the groups of cells 74 are arranged so that both of the anode layers 76 and cathode layers 77 are exposed to the passages 72. Therefore, in almost all of the passages 72 defined by the cells 73 of the groups of cells 74, the $NO_X$ and HC or CO in the exhaust gas are purified by applying current from the power device 81.

Action and Effects

Figure 5:
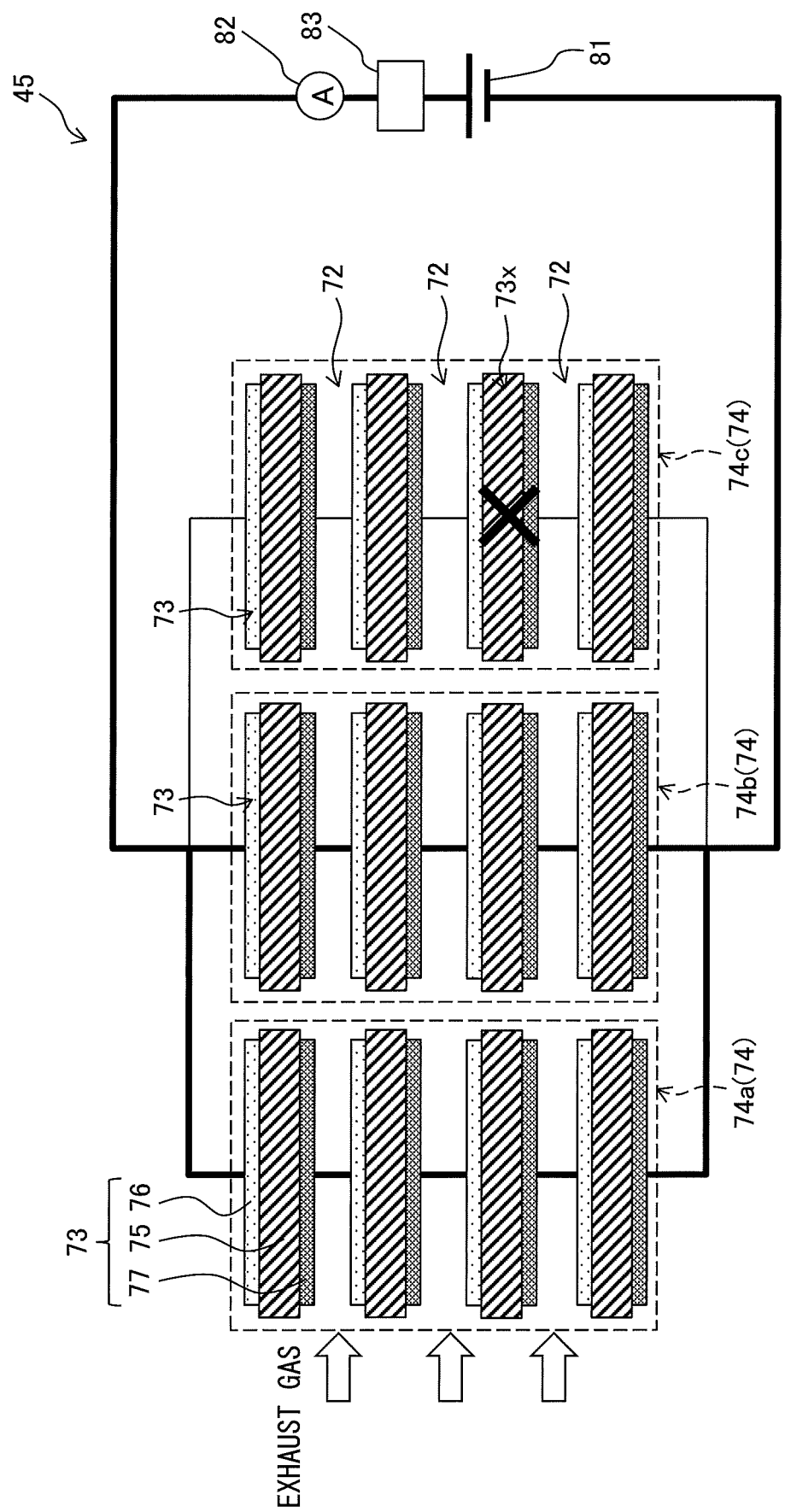
FIG. 5 is an enlarged cross-sectional view of a reactor, similar to FIG. 3, in a case where some of the cells forming the reactor malfunction.

Referring to FIG. 5, the action of the electrochemical reactor 45 according to the present embodiment and the effects obtained by this electrochemical reactor will be explained. FIG. 5 is an enlarged cross-sectional view of a reactor 45, similar to FIG. 3, in the case where a malfunction occurs in some of the cells 73 forming the reactor 45.

In the example shown in FIG. 5 as well, the reactor 45 has three groups of cells 74 arranged in the direction of flow of exhaust. In the following explanation, among these groups of cells 74, the group of cells 74 at the upstream-most side in the direction of flow of exhaust will be referred to as the "first group of cells 74a", the group of cells 74 at the center will be referred to as the "second group of cells 74b", and the group of cells 74 at the downstream-most side will be referred to as the "third group of cells 74c".

In the example shown in FIG. 5, a malfunction occurs in one cell 73x configuring the third group of cells 74c. Such a malfunction, for example, may include disconnection in the connecting part between the anode layer 76 of the cell 73x and the wiring or the connecting part between the cathode layer 77 and the wiring. If such a malfunction occurs, current no longer flows to the group of cells 74 including that cell 73x (third group of cells 74c). Therefore, it becomes no longer possible to purify the $NO_X$ and HC or CO in the exhaust gas by the cells 73 included in the third group of cells 74c.

However, in the present embodiment, the first group of cells 74a and the second group of cells 74b are connected to the power device 81 in parallel with the third group of cells 74c. Therefore, even if the cell 73x of the third group of cells 74c malfunctions, current flows through the cells 73 of the first group of cells 74a and the cells 73 of the second group of cells 74b (the bold lines in the circuit in the figure show the wiring through which current flows).

As a result, the exhaust gas flowing through the passages 72 extending from the upstream end to the downstream end of the reactor 45 is purified by at least the cells 73 of the first group of cells 74a and the cells 73 of the second group of cells 74b. Therefore, even if part of the cells 73 of the reactor 45 malfunction, the exhaust gas flowing into the reactor 45 can be sufficiently purified, and therefore it is possible to keep the purification rate of the exhaust gas from decreasing.

In particular, if a plurality of groups of cells 74 are provided in the direction of flow of exhaust, the most $NO_X$ and HC or CO are purified at the group of cells 74 into which the exhaust gas first flows. Therefore, even if there is a malfunction in the cells 73 of one of the group of cells 74 and the cells 73 of that group of cells 74 can no longer purify the exhaust gas, the cells 73 of the remaining groups of cells 74 purify most of the exhaust gas. Therefore, even if part of the cells 73 of the reactor 45 malfunction, the purification rate of the exhaust gas by the reactor 45 does not decrease that much.

Further, in the present embodiment, the cells 73 forming a group of cells 74 are at least partially connected in series. As a result, as explained below, $NO_X$ and HC or CO of the exhaust gas can be purified without the capacities of the power device 81 or wiring connecting the power device 81 and the cells 73 becoming that large.

Here, the amounts of the $NO_X$ and HC or CO able to be purified by the cells 73 per unit time change according to the current flowing through the cells 73. Therefore, to sufficiently purify the $NO_X$ and HC or CO in the exhaust gas, it is necessary to apply current of a certain extent of magnitude to the cells 73. For this reason, if connecting all of these cells 73 in parallel to the power device, it becomes necessary to apply an extremely large current for purification of the exhaust gas.

On the other hand, in the present embodiment, the cells 73 forming a group of cells 74 are at least partially connected in series. Therefore, it is no longer necessary to apply a large current from the power device 81. Accordingly, the power device 81 and wiring can be made smaller in capacities.

Modification

Preferred embodiments according to the present invention were explained in the above, but the present invention is not limited to these embodiments and can be modified and changed in various ways within the language of the claims.

Figure 6:
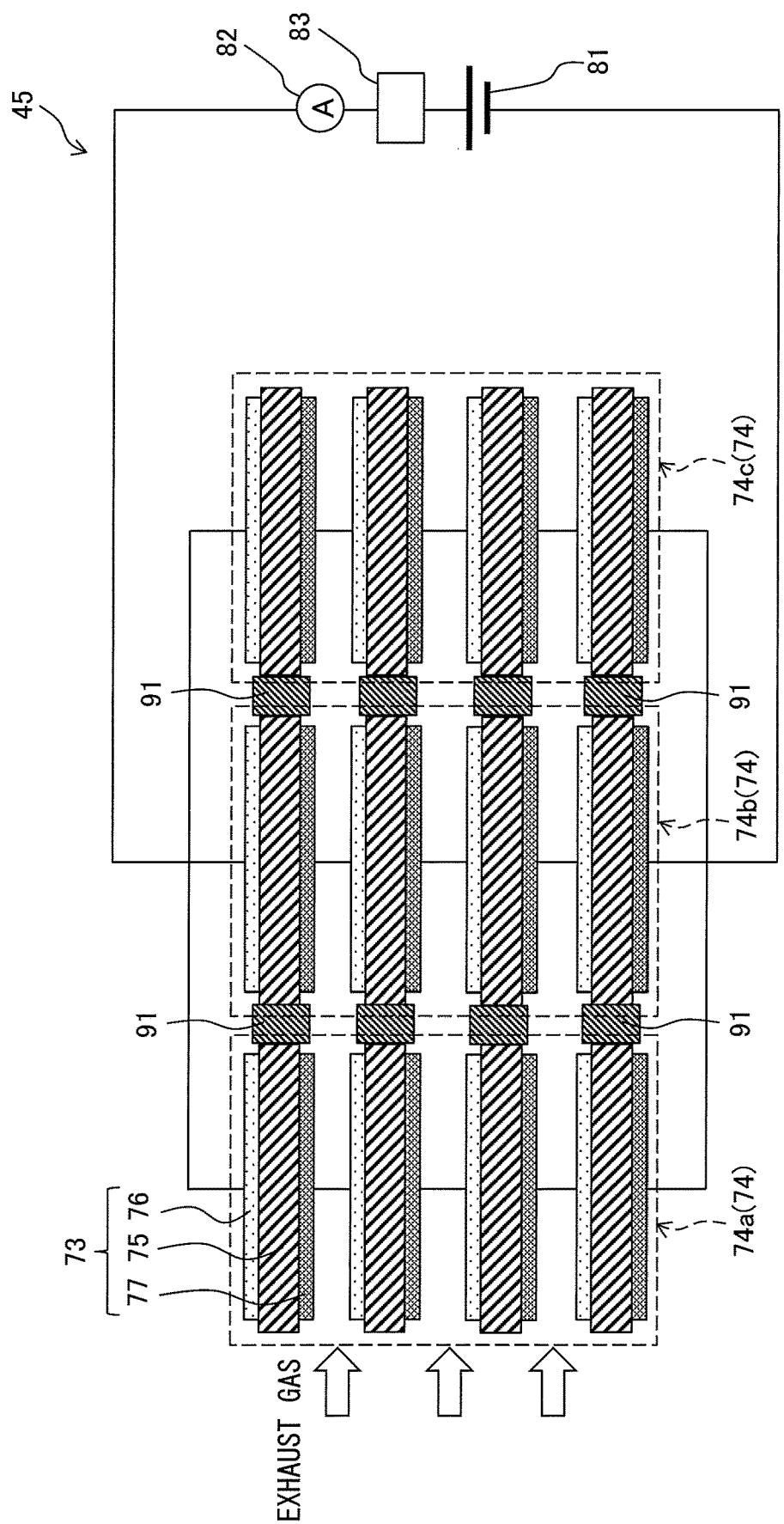
FIG. 6 is an enlarged cross-sectional view, similar to FIG. 3, showing the configuration of an electrochemical reactor according to a modification.

FIG. 6 is an enlarged cross-sectional view, similar to FIG. 3, which shows the configuration of the electrochemical reactor 45 according to a first modification. As will be understood from FIG. 6, in the present embodiment, spacers 91 are provided between two adjoining groups of cells 74. The two groups of cells 74 are connected with each other by the spacers 91. Specifically, spacers 91 are provided between the downstream ends of the solid electrolyte layers 75 of cells 73 forming the first group of cells 74a and the upstream ends of the solid electrolyte layers 75 of the cells 73 forming the second group of cells 74b. Similarly, spacers 91 are provided between the solid electrolyte layers 75 of cells 73 forming the second group of cells 74b and the solid electrolyte layers 75 of the corresponding cells 73 of the third group of cells 74c.

The spacers 91 have cross-sectional shapes the same as the cross-sectional shapes of the groups of cells 74 (for example, honeycomb shapes) in cross-sections perpendicular to the direction of flow of exhaust. Therefore, in the present modification, in two cells 73 arranged aligned in the direction of flow of exhaust (corresponding cells 73 of adjoining groups of cells 74), the solid electrolyte layers 75 of these cells 73 are connected with each other through a spacer 91.

Further, the spacers 91 are formed by a material with a lower proton conductivity (or ion conductivity) compared with the solid electrolyte layers 75 of the cells 73. For example, the spacers 91 are formed by an insulating material. Specifically, the spacers 91 are, for example, formed by alumina, cordierite, etc.

In the present first modification, the first group of cells 74a, second group of cells 74b, and third group of cells 74c are joined with each other by the spacers 91. For this reason, according to the present modification, it is possible to increase the strength of the reactor 45.

FIG. 7 is an enlarged cross-sectional view, similar to FIG. 3, which shows the configuration of an electrochemical reactor 45 according to a second modification. As will be understood from FIG. 7, in the present embodiment, the same material as the solid electrolyte layers 75 of the cells 73 is used for the spacers of the electrochemical reactor 45 according to the above-mentioned first modification.

Therefore, in the second modification, at the first group of cells 74a, second group of cells 74b, and third group of cells 74c, common solid electrolyte layers 75 are used. In other words, in the present second modification, the pluralities of cells 73 arranged aligned in the direction of flow of exhaust (corresponding cells 73 of adjoining groups of cells 74) are configured to share single integral solid electrolyte layers 75. Therefore, on the solid electrolyte layers 75 extending from the upstream end to the downstream end of the reactor 45, anode layers 76 and cathode layers 77 of cells 73 forming the first group of cells 74a, anode layers 76 and cathode layers 77 of corresponding cells 73 forming the second group of cells 74b, and anode layers 76 and cathode layers 77 of corresponding cells 73 forming the third group of cells 74c are arranged.

In the second modification, the pluralities of cells 73 arranged aligned in the direction of flow of exhaust are configured to share single integral solid electrolyte layers 75. Therefore, by just providing single solid electrolyte layers 75 with pluralities of anode layers 76 and cathode layers 77, it is possible to form cells 73 of different groups of cells 74. Therefore, according to the present modification, it is possible to easily manufacture the reactor 45.

The invention claimed is:

1. An electrochemical reactor arranged inside an exhaust passage of an internal combustion engine, comprising:
   a plurality of groups of cells, wherein
   each group of cell has a plurality of cells, each cell having an ion conducting solid electrolyte layer, and an anode layer and cathode layer arranged on a surface of the solid electrolyte layer,
   the each group of cells is configured so that all of exhaust gas flows into passages defined by cells configuring the group of cells and so that both of the anode layers and the cathode layers are exposed to each passage,
   the plurality of groups of cells are arranged aligned in a direction of flow of exhaust gas,
   the plurality of cells of each group of cells are connected in series, and
   the plurality of groups of cells are connected to a power source in parallel with each other.

2. The electrochemical reactor according to claim 1, wherein corresponding cells of adjoining groups of cells are configured so that solid electrolyte layers of these cells are joined with each other through spacers.

3. The electrochemical reactor according to claim 2, wherein corresponding cells of adjoining groups of cells are configured so as to share an integral single solid electrolyte layer.

* * * * *